US011652298B2

(12) United States Patent
Lackey et al.

(10) Patent No.: US 11,652,298 B2
(45) Date of Patent: May 16, 2023

(54) VIVALDI ANTENNA WINGS (71) Applicant: Vitesco Technologies USA, LLC, Auburn Hills, MI (US)

(72) Inventors: John Jefferson Lackey, Rochester, MI (US); Eric Servel, Roques sur Garonne (FR)

(73) Assignee: Vitesco Technologies USA, LLC, Auburn Hills, MI (US)

(*) Notice: Subject to any disclaimer, the term of this patent is extended or adjusted under 35 U.S.C. 154(b) by 61 days.

(21) Appl. No.: 17/320,354

(22) Filed: May 14, 2021

(65) Prior Publication Data
US 2022/0368022 A1 Nov. 17, 2022

(51) Int. Cl.
H01Q 13/08 (2006.01)
G01S 7/41 (2006.01)
H01Q 1/32 (2006.01)
H01Q 1/22 (2006.01)
G01S 13/04 (2006.01)

(52) U.S. Cl.
CPC ............. *H01Q 13/085* (2013.01); *G01S 7/41* (2013.01); *G01S 13/04* (2013.01); *H01Q 1/2283* (2013.01); *H01Q 1/3233* (2013.01)

(58) Field of Classification Search
CPC . G01S 7/41; G01S 13/04; G01S 13/56; G01S 13/931; H01Q 21/061; H01Q 13/085; H01Q 1/2283; H01Q 1/3233
See application file for complete search history.

(56) References Cited

FOREIGN PATENT DOCUMENTS

| EP | 3199976 A1 | * | 8/2017 | ........... G01S 13/931 |
| WO | WO-2014075839 A1 | * | 5/2014 | ......... G01S 13/4445 |
| WO | WO-2015010761 A1 | * | 1/2015 | ........... H01Q 13/085 |
| WO | WO-2017194503 A1 | * | 11/2017 | ............. G01S 13/42 |

* cited by examiner

Primary Examiner — Vibol Tan (57) ABSTRACT

A detection system for a vehicle, including at least one detection device operable for detecting objects in a detection area. The detection device also includes a first emission antenna, a first reception antenna, and a plurality of extension portions. One of the plurality of extension portions is integrally formed as part of the first emission antenna, and another of the plurality of extension portions is integrally formed as part of the first reception antenna. The first emission antenna generates an emission wave at a predetermined angle which contacts objects in the first detection area and deflects of the objects in the first detection area, and returns to the first reception antenna as a return wave. In an embodiment, the first emission antenna includes at least one Vivaldi wing, and the first reception antenna includes at least one Vivaldi wing.

14 Claims, 6 Drawing Sheets

VIVALDI ANTENNA WINGS

FIELD OF THE INVENTION

The invention relates generally to a Vivaldi antenna which is part of a detection system for a vehicle, where the Vivaldi antenna includes extensions, or wings, which improve the focus of the radiated RF beam, and increase the emission power.

BACKGROUND OF THE INVENTION

There are various types of systems which are used to detect when a user/driver has performed a kick motion, or other type of motion, when in proximity to the vehicle, such that when the motion is detected, a door, such as a lift gate, automatically opens. When the motion is detected, an authentication process begins to actuate the opening of the door or liftgate.

To detect such motion, a device may be used based on a RADAR principle, where the RF antenna which are commonly used in these types of recognition systems often times are subject to interference, or emit signal in undesirable directions. It is undesirable to have a strong electrical field on the back side of the vehicle (towards the passengers), or on the sides of the vehicle, where energy is wasted, or causes "cross-talk." These designs have too much rear and side signal in the ETA sensor output, and are not facilitative of detecting a "kick motion" from a driver/user of the vehicle. The RF antenna may cause the sensor to incorrectly activate the recognition system, resulting the door or liftgate being opened unintentionally. Previous solutions to these issues have included the implementation of additional material (i.e., an absorber material) used to absorb or deflect back or side signal. However, these solutions increase cost, and may require significant complications in design and manufacturing. Sensors without wings have been built and tested on vehicles. These sensors have also been tested in parallel in Physics simulations with highly detailed material properties and geometry. However, they exhibit the errors and issues mentioned above.

Accordingly, there exists a need for a recognition system which has an RF antenna which is not subject to interference, and has reduced incidence of unintentionally activating the authentication process.

SUMMARY OF THE INVENTION

In one embodiment, the present invention is a Vivaldi antenna which is part of a detection system, where the detection system triggers an authentication check to detect when a user/driver of a vehicle is within the predetermined distance to perform various functions, and that a motion performed by the driver/user is intended to trigger an opening of the liftgate. The Vivaldi antenna includes extensions, or wings, which improve the focus of the radiated RF beam, and increases the emission power. The extensions, or wings, change the energy distribution within the Vivaldi antenna trace, preventing the emission of a rear or a flank signal. The shape of the wings also leads to a boost in forward-facing signal, as energy is redistributed.

When using two Vivaldi antenna (one to emit, one to receive) according to the present invention, the shape of the Vivaldi antennas does not significantly harm the S(1,2) or the S(2,1) isolation despite appearing to nearly touch.

In an embodiment, the present invention is a detection system for a vehicle, including at least one detection device, at least one detection area, the detection device operable for detecting objects in the detection area. The detection device also includes a first emission antenna, a first reception antenna, and a plurality of extension portions. One of the plurality of extension portions is integrally formed as part of the first emission antenna, and another of the plurality of extension portions is integrally formed as part of the first reception antenna. The first emission antenna generates an emission wave at a predetermined angle which contacts objects in the first detection area and deflects of the objects in the first detection area, and returns to the first reception antenna as a return wave.

In an embodiment, the first emission antenna includes at least one Vivaldi wing, and the first reception antenna includes at least one Vivaldi wing.

In an embodiment, one of the plurality of extension portions integrally formed as part of the first reception antenna overlaps with another of the plurality of extension portions integrally formed as part of the first emission antenna.

In an embodiment, the detection device includes a printed circuit board (PCB), and the first emission antenna and the first reception antenna are mounted to a PCB.

In an embodiment, one of the plurality of extension portions integrally formed as part of the first reception antenna is located between the PCB and the another of the plurality of extension portions integrally formed as part of the first emission antenna.

In an embodiment, the detection device includes a second emission antenna and a second reception antenna. The second emission antenna and the second reception antenna are mounted to the PCB.

In an embodiment, a third of the plurality of extension portions is integrally formed as part of the first emission antenna, and a fourth of the plurality of extension portions integrally formed as part of the first reception antenna.

In an embodiment, each of the second emission antenna and the second reception antenna include at least one Vivaldi wing.

In an embodiment, the detection system includes a body control module, the at least one detection device in electrical communication with the body control module.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
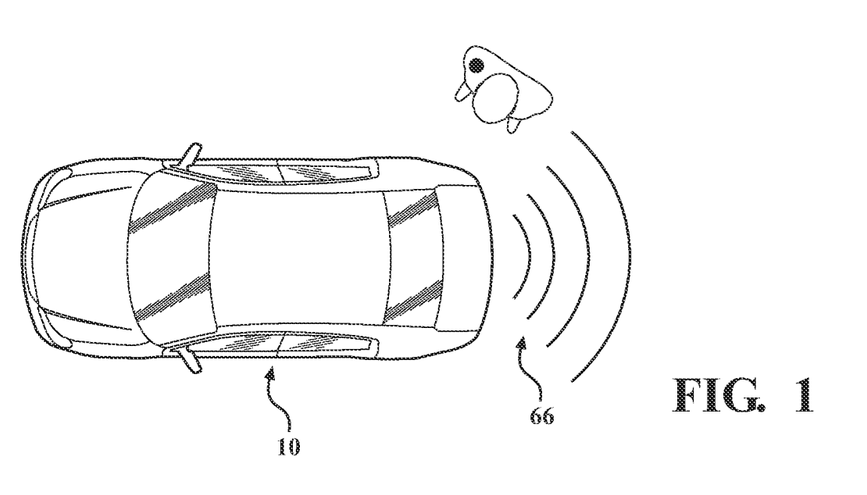
FIG. 1 is a diagram of a vehicle having detection system, according to embodiments of the present invention.

A vehicle having a detection system which includes at least one RF antenna having at least one Vivaldi extension or wing according to the present invention is shown in FIG. 1 generally at 10.

Figure 3:
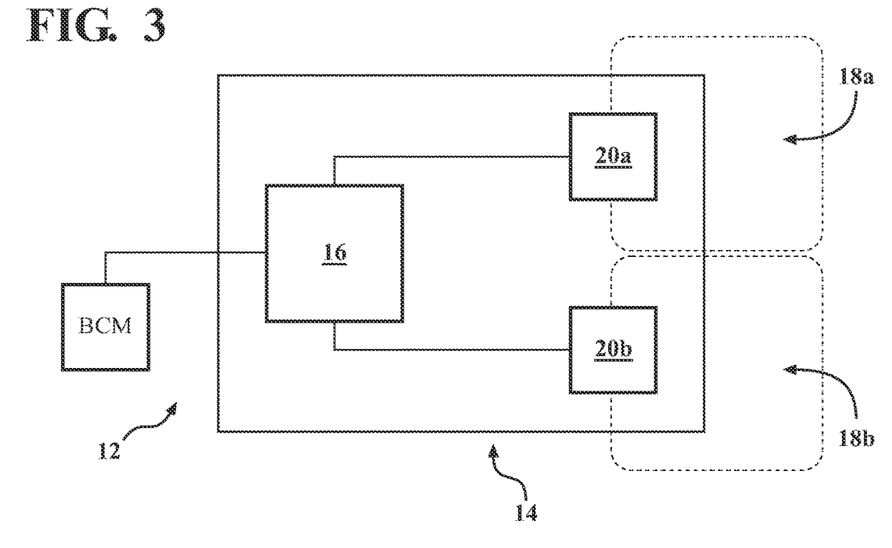
FIG. 3 is a diagram of a detection device used as part of a detection system, according to embodiments of the present invention.

The detection system is shown in FIG. 3, generally at 12. The detection system 12 includes at least one detection device, shown generally at 14. However, it is within the scope of the invention that additional detection devices may be used.

The detection device 14 includes a control unit 16, and in this embodiment the control unit 16 is a microcontroller in electrical communication with a body control module (BCM). The detection device 14 is able to detect objects in distinct detection areas. More specifically, the detection device 14 is able to detect objects in a first detection area, shown generally at 18*a*, and is able to detect objects in a second detection area, shown generally at 18*b*. The detection areas 18*a*,18*b* are located in proximity to the vehicle 10. In this embodiment, the detection areas 18*a*,18*b* are each an electrical field, but it is within the scope of the invention that other types of detection areas may be used.

Figure 4:
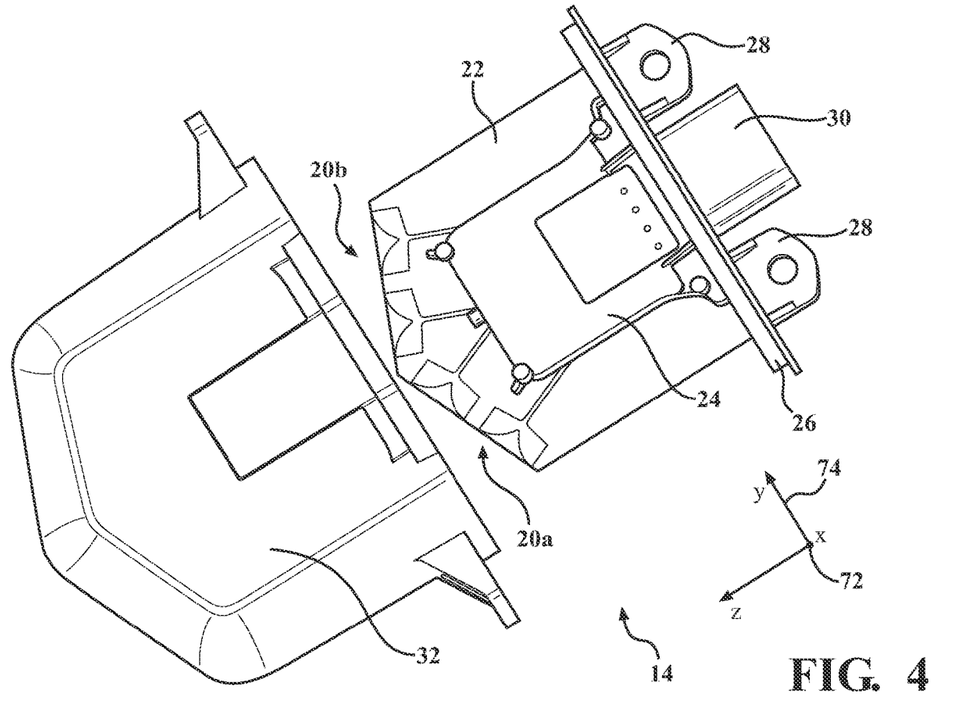
FIG. 4 is a partial exploded view of a detection device used as part of a detection system, according to embodiments of the present invention.

Referring to FIGS. 3-4, the detection device 14 includes a first pair of antennas 20*a* and a second pair of antennas 20*b*. In this embodiment, the first pair of antennas 20*a* is able to detect objects in the first detection area 18*a*, and the second pair of antennas 20*b* is able to detect objects in the second detection area 18*b*. In this embodiment, both pairs of antennas 20*a*,20*b* are tapered slot antennas, but it is within the scope of the invention that other types of antennas may be used. Both pairs of antennas 20*a*,20*b* are mounted to a printed circuit board (PCB) 22, and the control unit 16 (not shown in FIG. 4) is also mounted to the PCB 22. The PCB 22 is connected to a frame portion 24, and the frame portion 24 is connected to a base portion 26. Integrally formed as part of the base portion 26 are two brackets 28, which are used for mounting the detection device 14 to a bumper. Also integrally formed as part of the base portion 26 is a shroud 30 which surrounds a connector that is connected to the PCB 22, where the connector is in electrical communication with the BCM. The detection device 14 shown in FIG. 4 also includes a cover 32, which is connected to the base portion 26, for protecting the PCB 22 and the components mounted to the PCB 22.

Figure 5:
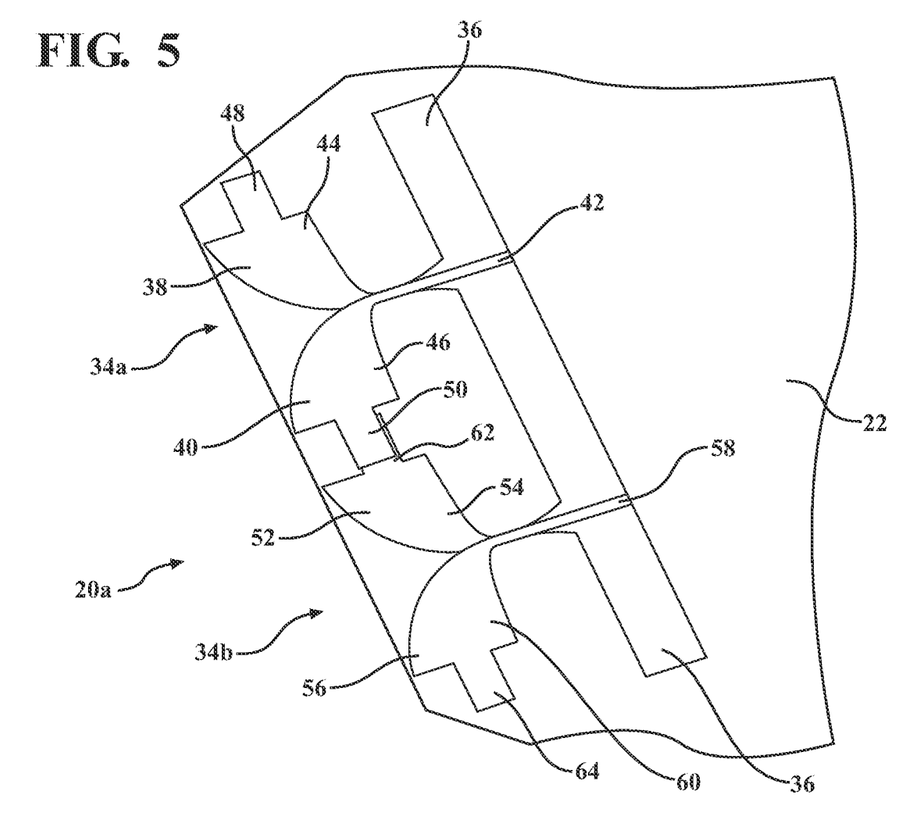
FIG. 5 is side view of a printed circuit board, with an emission antenna and a reception antenna, which are part of a detection device used as part of a detection system, according to embodiments of the present invention.
Figure 6:
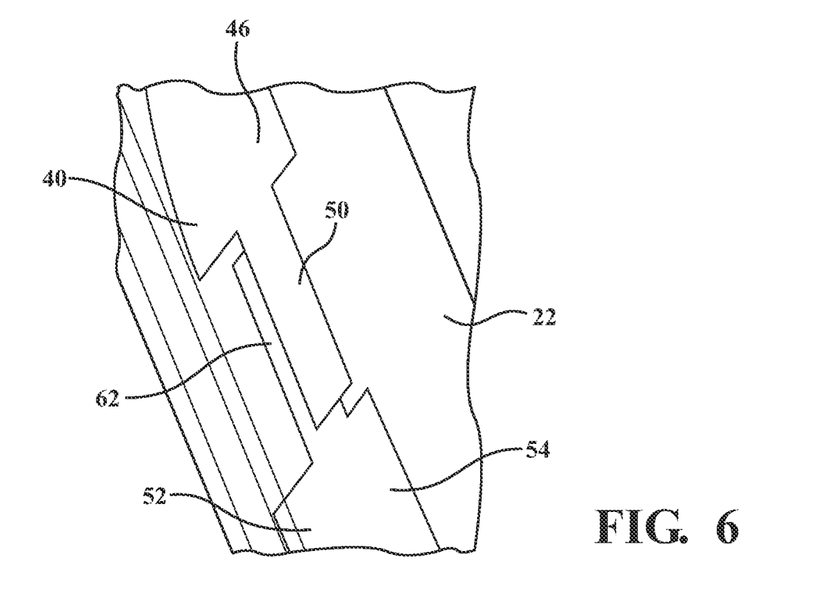
FIG. 6 is an enlarged perspective view of a portion of an emission antenna and a reception antenna which are part of a detection device, where the detection device is part of a detection system, according to embodiments of the present invention.

Referring to FIGS. 5 and 6, the first pair of antennas 20*a* is mounted to the PCB 22 and includes an emission antenna, shown generally at 34*a*, and a reception antenna, shown generally at 34*b*. The emission antenna 34*a* includes a ground plane 36 which is integrally formed with a ground layer 38, and a conductor layer 40 which is integrally formed with a microstrip 42. The ground layer 38 includes a first Vivaldi wing 44, and the conductor layer 40 includes a second Vivaldi wing 46. The first Vivaldi wing 44 includes a first extension portion, or flange 48, and the second Vivaldi wing 46 includes a second extension portion, or flange 50.

The reception antenna 34*b* is generally of similar construction compared to the emission antenna 34*a*. The ground plane 36 extends across the PCB 22, and is also part of the reception antenna 34*b*. Integrally formed as part of the ground plane 36 is another ground layer 52, which includes a first Vivaldi wing 54. The reception antenna 34*b* also includes a conductor layer 56 which is integrally formed with a microstrip 58, where the conductor layer 56 also has a Vivaldi wing 60. The Vivaldi wing 54 includes a first extension portion, or flange 62, and the second Vivaldi wing 60 includes a second extension portion, or flange 64.

The extension portion 50 of the Vivaldi wing 46 overlaps with the extension portion 62 of the Vivaldi wing 54, such that the extension portion 62 of the Vivaldi wing 54 is located between the PCB 22 and the extension portion 50 of the Vivaldi wing 46.

Figure 2:
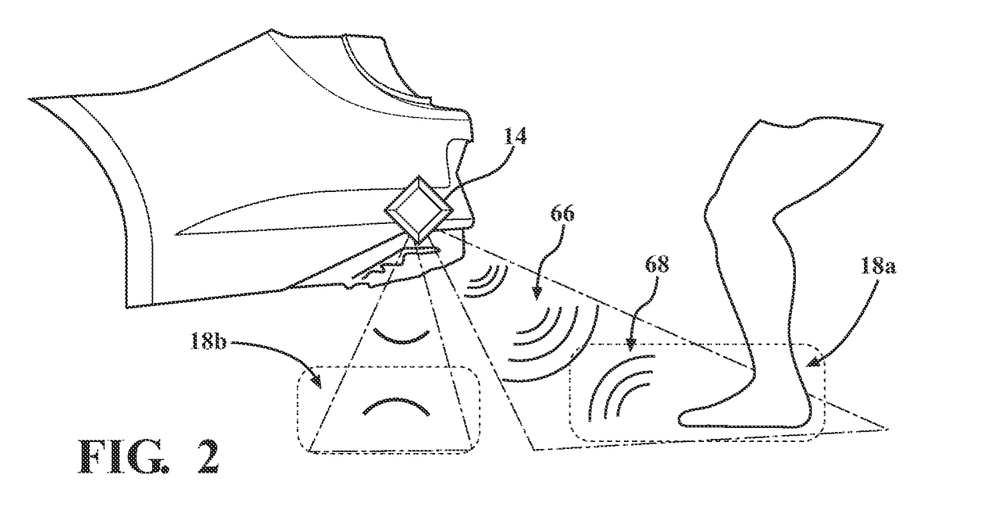
FIG. 2 is a perspective view of a portion of a bumper of a vehicle, and a detection device attached to the bumper, where the detection device is part of a detection system, according to embodiments of the present invention.

During operation, the control unit 16 sends a signal to the emission antenna 34*a* such that the emission antenna 34*a* generates an emission wave, shown generally at 66 in FIG. 2. The emission wave 66 contacts objects in the first detection area 18*a*, and bounces off objects in the first detection area 18*a*, and moves back towards the reception antenna 34*b* in the form of a return wave, shown generally at 68. If there is a motion detected, more specifically a kick motion from the user/driver of the vehicle, the emission wave 66 bounces off the leg or foot of the driver/user, and the return wave 68 moves towards the detection device 14 and is detected by the reception antenna 34*b*. The first pair of antennas 20*a* and a second pair of antennas 20*b* function in the same manner, and such that two emission waves are emitted in different directions (shown in FIG. 2), such that if an object is detected in both detection areas 18*a*,18*b*, the confirmation of a kick motion is detected, and the control unit 16 communicates a signal to the BCM that a "valid kick" has been detected, such that the door/liftgate is opened.

Figure 7:
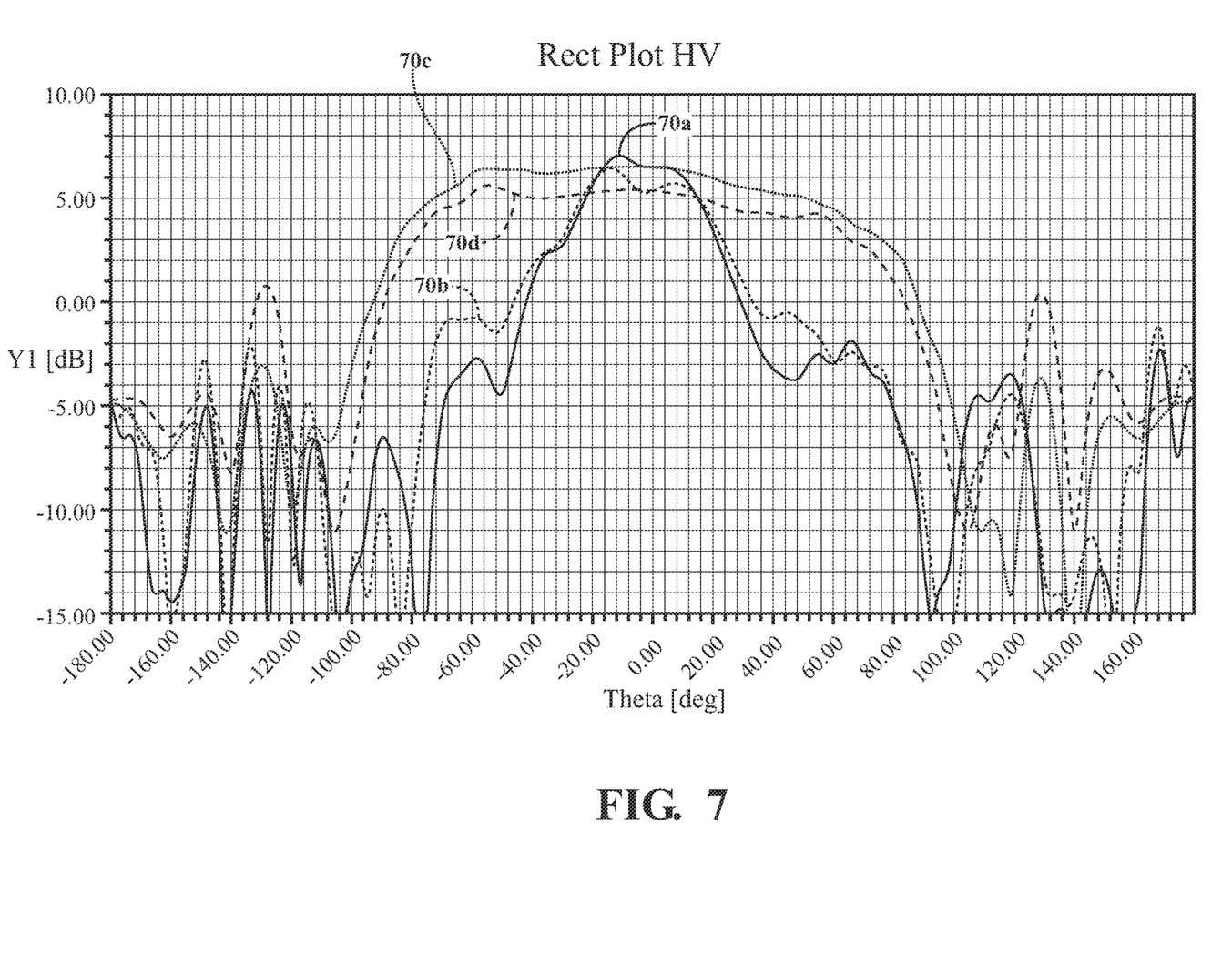
FIG. 7 is a graph depicting the angle of emission waves generated by a detection device having an emission antenna with extension portions compared to a detection device having an emission antenna with no extension portions.

Referring now to FIG. 7, a comparison of the emission wave emitted by a detection device 14 having the extension portions 48,50,62,64 and an emission wave emitted by a detection device with no extension portions is shown. There are four different curves 70*a*,70*b*,70*c*,70*d* shown in FIG. 7. The first curve 70*a* depicts the angle of the emission wave 66 along the in the Y-Z plane shown in FIG. 4, and the third curve 70*c* depicts the angle of the emission wave 66 in the X-Z plane, also shown in FIG. 4.

The second curve 70*b* and the fourth curve 70*d* depict the angles of an emission wave emitted by a detection device that does not have extension portions. The second curve 70*b* depicts the angle of emission wave along the Y-Z plane shown in FIG. 4, and the fourth curve 70*d* depicts the angle of the emission wave along the X-Z plane, also shown in FIG. 4.

Referring again to FIG. 7, it is shown that the first curve 70a has a higher peak near 0°, and has a width of approximately 160°, which is narrower compared to the second curve 70b, representing that the emission wave 66 has better focus than an emission wave emitted by a detection device having no extension portions. The third curve 70c is higher overall, and has a width of approximately 208°, which is wider and higher compared to the fourth curve 70d, representing that the emission wave 66 has more power than an emission wave emitted by a detection device having no extension portions.

It is shown in FIG. 7 that the detection device 14 having the emission antenna 34a and reception antenna 34b provides a stronger, more focused emission wave 66, that has a broader range. Although it is shown the extension portions 48,50,62,64 in the Figures are generally rectangular in shape, it is within the scope of the invention that extension portions having various shapes may be used.

There are four different curves 70a,70b,70c,70d shown in FIG. 7. The first curve 70a depicts the angle of the emission wave 66 along the x-axis 72 shown in FIG. 4, and the third curve 70c depicts the angle of the emission wave 66 along the y-axis 74, also shown in FIG. 4.

Figure 8:
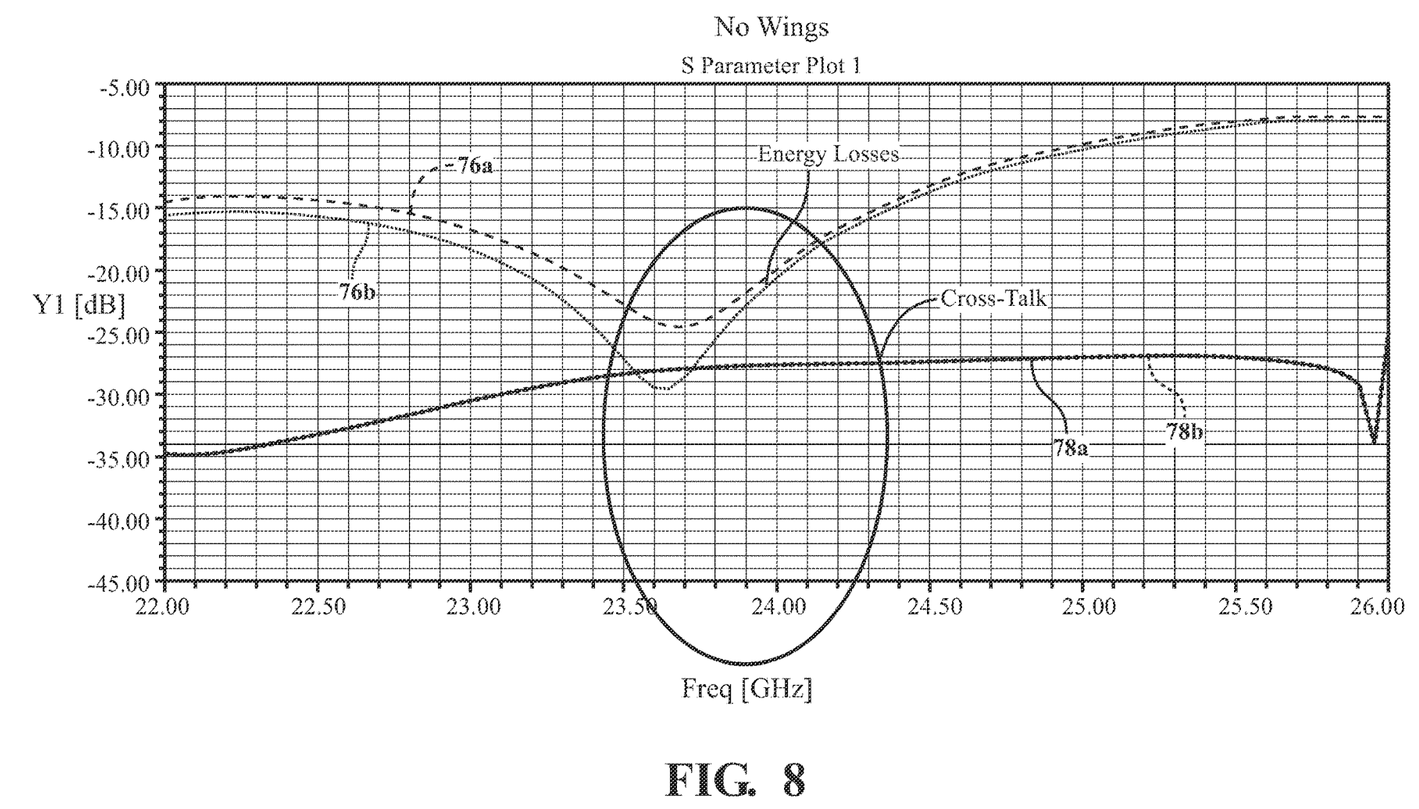
FIG. 8 is a graph depicting the energy losses of emission waves generated by a detection device having an emission antenna with no extension portions.
Figure 9:
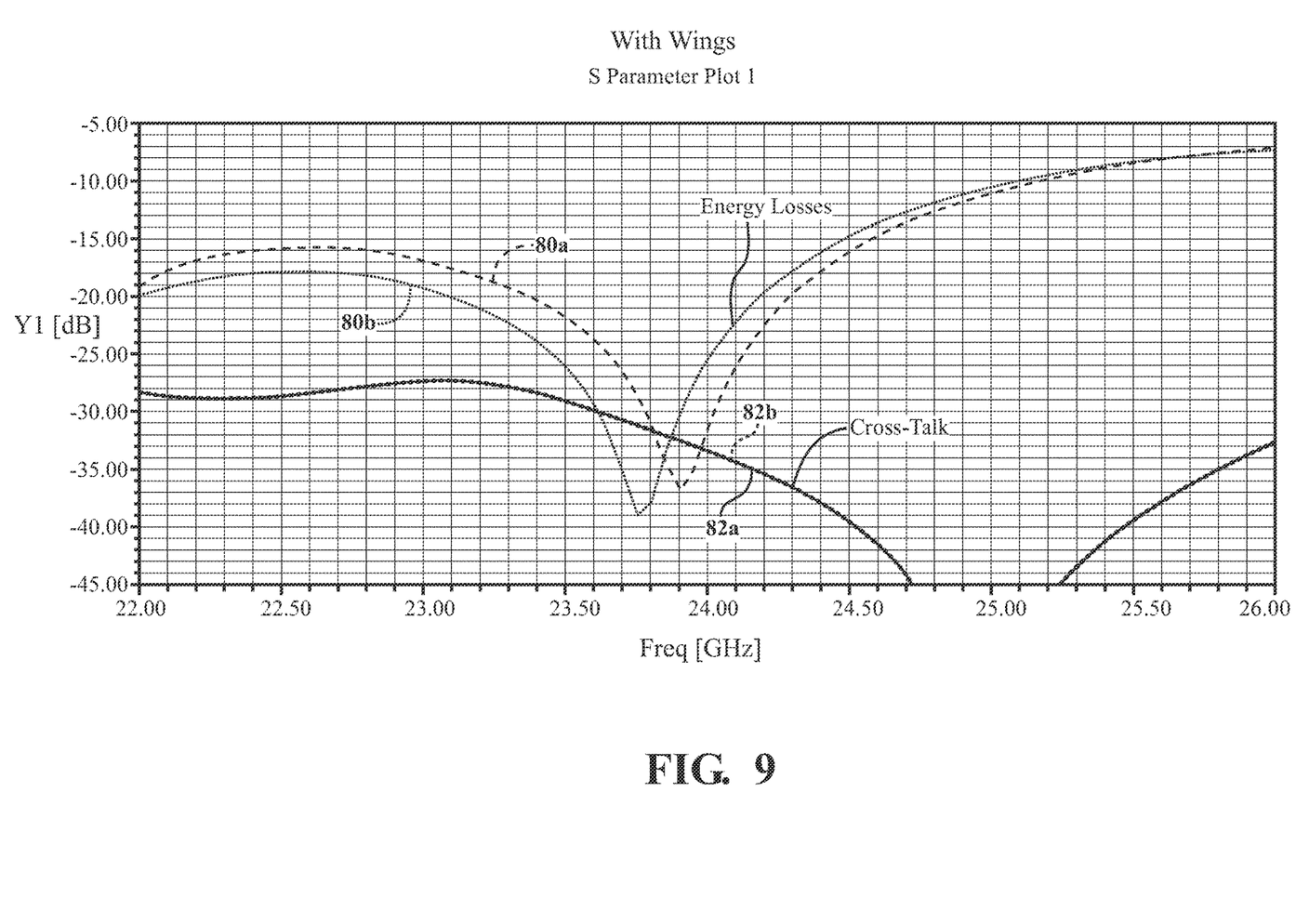
FIG. 9 is a graph depicting the energy losses of emission waves generated by a detection device having an emission antenna with extension portions, according to embodiments of the present invention.

Referring to FIGS. 8 and 9, a comparison is shown between a comparison of a detection device 14 having the extension portions 48,50,62,64 and a detection device with no extension portions. Referring now to FIG. 8, the curves 76a,76b provide a graphic representation of energy losses between a conductor layer and a ground layer of a detection device which does not have an extension portion. The curves 78a,78b provide a graphic representation of the cross-talk between a conductor layer and a ground layer of a detection device which does not have an extension portion.

Referring to FIG. 9, the curves 80a,80b provide a graphic representation of energy losses between a conductor layer and a ground layer of the detection device 14 having the extension portions 48,50,62,64. FIG. 9 also includes curves 82a,82b which provide a graphic representation of the cross-talk between a conductor layer and a ground layer of the detection device 14 having the extension portions 48,50, 62,64.

As is shown when comparing FIGS. 8 and 9, the difference between the energy losses (in dB), or S Parameters, when comparing a detection device with no extension portions to the detection device 14 with the extension portions 48,50,62,64 is minimal, or slightly improved by the implementation of the extension portions 48,50,62,64. Furthermore, the cross-talk is also improved with the implementation of the extension portions 48,50,62,64.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   a detection system for a vehicle, including:
      at least one detection device;
      at least one detection area, the at least one detection device operable for detecting objects in the detection area;
      a first emission antenna being part of the at least one detection device;
      a first reception antenna being part of the at least one detection device; and
      a plurality of extension portions, a one of the plurality of extension portions integrally formed as part of the first emission antenna, and another of the plurality of extension portions integrally formed as part of the first reception antenna, and one of the plurality of extension portions integrally formed as part of the first reception antenna overlaps with the another of the plurality of extension portions integrally formed as part of the first emission antenna;
      wherein the first emission antenna generates an emission wave at a predetermined angle which contacts objects in the first detection area, and deflects of the objects in the first detection area, and returns to the first reception antenna as a return wave.

2. The apparatus of claim 1, the first emission antenna further comprising at least one Vivaldi wing.

3. The apparatus of claim 1, the first reception antenna further comprising at least one Vivaldi wing.

4. The apparatus of claim 1, further comprising a printed circuit board (PCB), wherein the first emission antenna and the first reception antenna are mounted to a PCB.

5. The apparatus of claim 4, wherein the one of the plurality of extension portions integrally formed as part of the first reception antenna is located between the PCB and the another of the plurality of extension portions integrally formed as part of the first emission antenna.

6. The apparatus of claim 4, further comprising:
   a second emission antenna; and
   a second reception antenna, wherein the second emission antenna and the second reception antenna are mounted to the PCB.

7. The apparatus of claim 6, further comprising:
   a third of the plurality of extension portions integrally formed as part of the first emission antenna; and
   a fourth of the plurality of extension portions integrally formed as part of the first reception antenna.

8. The apparatus of claim 6, each of the second emission antenna and the second reception antenna further comprising a Vivaldi wing.

9. The apparatus of claim 1, further comprising a body control module, the at least one detection device in electrical communication with the body control module.

10. A detection system for a vehicle, comprising:
   at least one detection device;
   a first pair of antennas being part of the at least one detection device, the first pair of antennas including a first emission antenna and a first reception antenna operable for detecting objects in a first detection area;
   the first emission antenna further comprising:
      a first Vivaldi wing, the first of the plurality of extension portions is integrally formed as part of the first Vivaldi wing;
      a second Vivaldi wing, the second of the plurality of extension portions is integrally formed as part of the second Vivaldi wing;
   the first reception antenna further comprising:
      a third Vivaldi wing, a third of the plurality of extension portions is integrally formed as part of the third Vivaldi wing;
      a fourth Vivaldi wing, a fourth of the plurality of extension portions is integrally formed as part of the fourth Vivaldi wing;
   a second pair of antennas being part of the at least one detection device, the first pair of antennas being adjacent the second pair of antennas, the second pair of antennas including a second emission antenna and a second reception antenna operable for detecting objects in a second detection area; and a plurality of extension portions, one of the plurality of extension portions integrally formed as part one of the first emission antenna or the first reception antenna;

wherein the first pair of antennas generate at least one wave emitted at a predetermined angle to detect objects in the first detection area, and the second pair of antennas generate another wave emitted at a second predetermined angle to detect objects in the second detection area.

11. The detection system for a vehicle of claim 10, wherein the second of the plurality of extension portions is overlapped with the third of the plurality of extension portions.

12. The detection system for a vehicle of claim 10, wherein the first emission antenna and the first reception antenna are mounted to a printed circuit board (PCB), such that the third of the plurality of extension portions is located between the PCB and the second of the plurality of extension portions.

13. The detection system for a vehicle of claim 10, the second pair of antennas further comprising a second emission antenna and a second reception antenna.

14. The detection system for a vehicle of claim 10, further comprising:

a body control module in electrical communication with the at least one detection device;

wherein if an object is detected in both detection areas, the body control module sends a signal to command a door to open.

* * * * *